3,459,792
CINNAMYLOXY GUANIDINES AND
THE SALTS THEREOF
Robert Paul Mull, Florham Park, N.J., assignor to Ciba
 Corporation, New York, N.Y., a corporation of
 Delaware
No Drawing. Continuation-in-part of application Ser. No.
 603,749, Dec. 22, 1966. This application Aug. 9, 1967,
 Ser. No. 659,341
Int. Cl. C07c *129/12*
U.S. Cl. 260—501.12                                10 Claims

ABSTRACT OF THE DISCLOSURE

Aralkenyloxy-guanidines having the formula

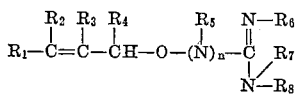

$R_1$=carbocyclic aryl
$R_2$–$R_8$=H or lower alkyl
$R_5$, $R_8$=also amino
$R_6$+$R_7$=also lower alkylene
$n$=integer 1 or 2 and acid addition salts thereof exhibit anorexigenic effects.

CROSS-REFERENCES TO RELATED APPLICATIONS

This is a continuation-in-part of application Ser. No. 603,749, filed Dec. 22, 1966 and now U.S. Patent No. 3,413,303, which in turn is a continuation-in-part of application Ser. No. 544,124, filed Apr. 21, 1966, which in turn is a continuation-in-part of application Ser. No. 490,670, filed Sept. 27, 1965 both now abandoned.

SUMMARY OF THE INVENTION

The present invention concerns and has for its object the provision of new aralkenyloxy-guanidines, more particularly those of Formula I

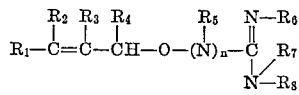

in which $R_1$ stands for carbocyclic aryl, each of $R_2$, $R_3$, $R_4$, $R_5$, $R_6$, $R_7$ and $R_8$ for hydrogen or lower alkyl or one of $R_5$ and $R_8$ also for amino, mono- or di-lower alkylamino, or $R_6$ and $R_7$, when taken together, also for lower alkylene and $n$ for the integer 1 and, in case $R_5$ and $R_8$ stand for hydrogen or lower alkyl, also for the integer 2, and acid addition salts thereof, as well as of pharmaceutical compositions containing them and methods for the preparation of these products. Said compositions are especially useful as anti-appetite agents.

DESCRIPTION OF THE PREFERRED EMBODIMENTS

The carbocyclic aryl group $R_1$ more especially is mono- or bicyclic carbocyclic aryl, above all phenyl, as well as 1- or 2-naphthyl, which is unsubstituted or substituted by one or more than one of the same or of different substituents attached to any of the positions available for substitution. Such substituents are, for example, lower alkyl, e.g. methyl, ethyl, n- or i-propyl, -butyl, -pentyl, -hexyl or -heptyl, etherified or esterified hydroxy or mercapto, such as lower alkoxy, e.g. methoxy, ethoxy, n- or i-propoxy or n-butoxy, lower alkenyloxy, e.g. allyloxy, lower alkylenedioxy, e.g. methylenedioxy, aryloxy, e.g. phenoxy, lower alkylmercapto, e.g. methyl- or ethylmercapto, halogeno, e.g. fluoro, chloro or bromo, trifluoromethyl, lower alkoxy-carbonyloxy, e.g. methoxy- or ethoxy-carbonyloxy, lower alkanoyloxy, e.g. acetoxy or propionyloxy, acyl, such as lower alkanoyl, e.g. acetyl or propionyl, nitro, amino, preferably tert. amino, such as di-lower alkylamino, e.g. dimethylamino or diethylamino. As used above and hereinafter in connection with hydrocarbon radicals the term "lower" defines such with up to 7 carbon atoms.

Preferred aryl groups $R_1$ are phenyl, (lower alkyl)-phenyl, di-(lower alkyl)-phenyl, (lower alkoxy)-phenyl, (phenoxy)-phenyl, (halogeno)-phenyl, (trifluoromethyl)-phenyl, (lower alkoxy-carbonyloxy)-phenyl, (lower alkanoyloxy)-phenyl, (lower alkanoyl)-phenyl and (di-lower alkylamino)-phenyl.

The groups $R_2$, $R_3$, $R_4$, $R_5$, $R_6$, $R_7$ and $R_8$ stand primarily for hydrogen, but may also be one of the lower alkyl groups exemplified above. They preferably contain one to four carbon atoms and are particularly methyl groups. Such lower alkyl groups are also present in the mono-or di-lower alkylamino groups $R_5$ and $R_8$ respectively. A lower alkylene group $R_6$+$R_7$ preferably is 1,2-ethylene, but may also be 1,2- or 1,3-propylene, 1,2-, 1,3-, 1,4- or 2,3-butylene, 2,3- or 2,4-pentylene.

The compounds of the invention exhibit valuable pharmacological properties. Apart from their activity to increase the coronary blood flow, their hypotensive and anti-inflammatory effects, they show primarily long lasting anorexigenic activity, as can be demonstrated in animal tests using, for example, mammals, such as cats, dogs or monkeys, as test objects. In the latter, they suppress the food-motivated behavior without causing stimulation. Besides their above-mentioned utility, they are also useful as intermediates in the preparation of other valuable, especially pharmacologically active compounds.

Particularly useful are compounds of the Formula I, in which $R_1$ stands for phenyl, (lower alkyl)-phenyl, di-(lower alkyl)-phenyl, (lower alkoxy)-phenyl, (phenoxy)-phenyl, (halogeno)-phenyl, (trifluoromethyl)-phenyl, (lower alkoxy-carbonyloxy)-phenyl, (lower alkanoyloxy)-phenyl, (lower alkanoyl)-phenyl and (di-lower alkylamino)-phenyl, each of $R_2$, $R_3$, $R_4$, $R_5$, $R_6$, $R_7$ and $R_8$ for hydrogen or alkyl with up to 4 carbon atoms or one of $R_5$ and $R_8$ also for amino, mono- or dialkylamino, or $R_6$ and $R_7$ together also for alkylene, in which alkyl or alkylene contains up to 4 carbon atoms, $n$ for the integer 1 and, in case $R_5$ and $R_8$ stand for hydrogen or alkyl, also for the integer 2, and pharmaceutically acceptable acid addition salts thereof.

Very valuable are compounds of the Formula II

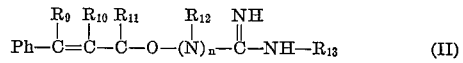 (II)

in which Ph stands for phenyl, (lower alkyl)-phenyl, di-(lower alkyl)-phenyl (lower alkoxy)-phenyl, (phenoxy)-phenyl, (halogeno)-phenyl or (trifluoromethyl)-phenyl, each of $R_9$, $R_{10}$, $R_{11}$, $R_{12}$ and $R_{13}$ for hydrogen or methyl or one of $R_{12}$ and $R_{13}$ also for amino, $n$ for the integer 1 and, in case $R_{12}$ and $R_{13}$ stand for hydrogen or methyl, also for the integer 2, and pharmaceutically acceptable acid addition salts thereof.

Especially mentioned are compounds of Formula III

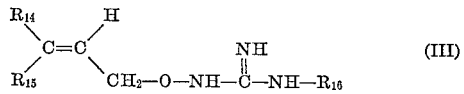 (III)

in which one of $R_{14}$ and $R_{15}$ stands for hydrogen and the other for phenyl, methyl-phenyl, dimethyl-phenyl, methoxy-phenyl, phenoxy-phenyl, chloro-phenyl or trifluoromethyl-phenyl and $R_{16}$ for hydrogen or amino, the hydrochlorides, hemisulfates or cyclohexylsulfamates thereof which, when applied orally to monkeys at a dose between about 5 and 150 mg./kg./day show outstanding anti-appetite activity.

The compounds of this invention are prepared according to known methods. For example, they are prepared by the process wherein, (a) An aralkenyloxy-amine or -hydrazine is reacted with a cyanamide, 1-guanyl-pyrazole, cyanahydrazide, 1-aminoguanyl-pyrazole, carbodiimide, guanidine, aminoguanidine or an etherified isourea, isothiourea, isosemicarbazide or isothiosemicarbazide or (b) An aralkenyloxy-cyanamide, -cyanhydrazide, -urea, -thiourea, -semicarbazide, -thioseimcarbazide or an O- or S-ether thereof, is subjected to ammonolysis, aminolysis or hydrazinolysis, with the provision that the reactants mentioned together contain at most one hydrazino moiety and, if desired, a resulting aralkenyloxy-guanidine is subjected to hydrazinolysis and/or a resulting base is converted into a salt or a resulting salt is converted into the corresponding base or into another salt and/or a resulting mixture of isomers is separated into the single isomers.

Ethers of the urea, thiourea, semicarbazide and thiosemicarbazide compounds mentioned under (a) and (b) are, for example, the lower alkyl ethers, such as the methyl, ethyl, propyl or butyl ethers. The other reactants mentioned may be unsubstituted or correspondingly substituted by lower alkyl or alkylene, such as that mentioned above, provided that the aralkenyloxy-amine or -hydrazine compounds mentioned under (a) and the amine or hydrazine mentioned under (b) contains at least one hydrogen atom bound to nitrogen. The 1-guanyl-pyrazoles may also contain substituents, such as lower alkyl, preferably in the 3- and/or 5-position.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or super-atmospheric pressure.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicylic, aminoalicylic, embonic, nicotinic, methanesulfonic, ethanesulfonic, hydroxyethanesulfonic, ethylenesulfonic, halogenbenzenesulfonic, toluenesulfonic, naphthalenesulfonic, cyclohexylsulfamic and sulfanilic acid; methionine, tryptophan, lysine and arginine.

These or other salts of the new compounds, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts.

For example, the cyanamide reagent mentioned under item (a) may be formed in situ from a nitroso-guanidine, such as methylcyanamide from 1-nitroso-3-methyl-guanidine and analogous also the cyanahydrazide. The ammonia, prim. or sec. amine or hydrazine used in reaction (b) may also be released during the reaction from a corresponding salt or addition compound, such as ammonium sulfate, methylammonium acetate, urotropin, hydrazine hydrate and the like. Preferably one of the reactants mentioned under (a) and (b) is used in the form of its salt, which especially is derived from a mineral acid, such as a hydrohalic, sulfuric, phosphoric or nitric acid, or from a metal, such as an alkali or alkaline earth metal, e.g. sodium, potassium or calcium. Such metal salts are preferably used from cyanamides or -hydrazides, which may be reacted with an ammonium or hydrazine salt, such as ammonium nitrate or hydrazine sulfate.

Mainly, those starting materials should be used in the reactions of the invention that lead to the formation of those compounds indicated above as being specially valuable.

The starting materials are known, or if new, may be prepared according to known methods, for example according to those described in "Chimia," vol. 18, pp. 1–16 (1964).

The starting materials as well as the compounds of the invention may be in the form of mixtures of isomers or of single isomers. Thus, they are preferably in the form of their geometric cis- and trans-isomers. A mixture of such isomers may be separated by fractional crystallization and/or chromatography.

The compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragées or capsules, or in liquid form as solutions, suspensions or emulsions. They may be sterilized and/or contain adjuvants, such as preserving, stabilizing, wetting or emulsifying agents, solution promotors, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, all parts wherever given are parts by weight and the water used is free of carbon dioxide.

EXAMPLE 1

The mixture of 5.0 g. O-(trans-cinnamyl)-hydroxylamine, 3.73 g. S-methyl-isothiourea sulfate and 10 ml. water is refluxed for 6 hours and then concentrated under reduced pressure. The residue is recrystallized from aqueous ethanol to yield the hydroscopic trans-1-cinnamyloxy-guanidine hemisulfate of the formula

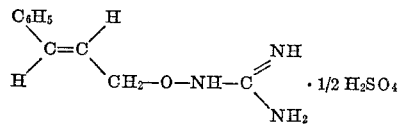

The starting material is prepared as follows:
The mixture of 65.2 g. N-hydroxy-phthalimide, 122 ml.

triethylamine, 61.0 g. trans-cinnamylchloride and 600 ml. dimethylformamide is heated on the steam bath for 2 hours, then cooled and diluted with 1000 ml. water. The precipitate formed is filtered off and washed with water to yield the N-(trans-cinnamyloxy)-phthalimide melting at 149–152°.

70.0 g. thereof in 800 ml. methylene chloride are added to a solution of 13.0 g. hydrazine hydrate in 25 ml. methanol and the mixture is stirred at room temperature for 25 hours. Hereupon it is filtered, the residue washed with methylene chloride and the filtrate concentrated in vacuo. The residue is extracted with diethyl ether, the extract acidified with isopropanolic hydrochloric acid, filtered and the residue recrystallized from methanol-ethyl acetate to yield the O - (trans-cinnamyl) - hydroxylamine hydrochloride melting at 192–193°. The free base is obtained from a concentrated aqueous solution of said hydrochloride which is made basic with aqueous potassium hydroxide, extracted with diethyl ether; the extract is then dried and evaporated under reduced pressure.

EXAMPLE 2

The mixture of 5.5 g. O-(cis-cinnamyl)-hydroxylamine and 5.3 g. S-methyl-isothiosemicarbazide hydrochloride and 30 ml. methanol is refluxed for 6 hours and then concentrated in vacuo. The residue is recrystallized from acetonitrile to yield the cis-1-cinnamyloxy-3-amino-guanidine hydrochloride of the formula $$\begin{array}{c} C_6H_5 \\ \phantom{C_6H_5}\diagdown \\ \phantom{C_6H_5}\phantom{\diagdown}C=C \\ H\phantom{\diagdown}\diagup\phantom{C}\diagdown \\ \phantom{H\diagup}\phantom{C}\phantom{\diagdown}H \end{array} \begin{array}{c} CH_2-O-NH \\ \phantom{CH_2-O-NH}\diagdown \\ \phantom{CH_2-O-NH}\phantom{\diagdown}C \\ \phantom{CH_2-O-NH}\diagup\phantom{C}\diagdown \\ \phantom{CH_2-O-NH\diagup}NH-NH_2 \end{array} \begin{array}{c} NH \\ \diagup\diagup \\ \\ \end{array} \cdot HCl$$

EXAMPLE 3

According to the method described in the previous examples and using the equivalent amount of the corresponding starting materials, the following compounds can be prepared: cis - 1 - cinnamyloxy-guanidine hemisulfate, trans-1-(p-methoxycinnamyloxy)-guanidine hemisulfate, trans-1-(o-, m- or p-chloro-cinnamyloxy)-guanidine hemisulfate, cis-1-(m- or p-methyl-cinnamyloxy) - guanidine hemisulfate, cis-1-(o,p-dimethyl-cinnamyloxy) - guanidine hemisulfate, trans-1-cinnamyloxy-2,3-dimethyl-guanidine hydroiodide, trans-1-cinnamyloxy-3-amino-guanidine hydrochloride and trans-1-(p-methoxy-cinnamyl)-3-amino-guanidine hydrochloride.

Several of the starting materials and intermediates described in the process of the invention are described in U.S. Patent No. 3,332,988.

EXAMPLE 4

1000 tablets each containing 0.015 g. of the active ingredient:

| Material | G. |
| --- | --- |
| Trans-cinnamyloxy-guanidine hemisulfate | 15.0 |
| Tragacanth | 3.0 |
| Lactose | 123.0 |
| Corn starch | 7.5 |
| Magnesium stearate | 1.5 |
| 50% aqueous ethanol, q.s. | |

Procedure

The hemisulfate, the tragacanth and the lactose are mixed in a suitable mixer and granulated with the ethanol. The granulate is passed through a No. 10 screen, dried at room temperature with circulating air, and passed through a No. 16 screen. The screened material is returned to the mixer, the corn starch and the magnesium stearate are added and mixing is continued. The mixture is again passed through a No. 16 screen and compressed into tablets, each weighing 0.15 g. using $^{10}\!/_{32}$ inch standard, concave punches, uppers bisected.

EXAMPLE 5

The mixture of 5.0 g. O-(trans-cinnamyl)-hydroxylamine, 1.14 g. cyanamide and 50 ml. toluene is refluxed for two hours under nitrogen while stirring. Hereupon it is evaporated in vacuo, the oily residue dissolved in water and the solution made basic with aqueous sodium hydroxide. The resulting suspension is cooled, filtered, the residue washed with water, dried and recrystallized from isopropanol to yield the trans-1-cinnamyloxy-guanidine, melting at 118–120°.

1.91 g. thereof are dissolved in the minimal amount of water and to the solution 5 ml. N-sulfuric acid and 10 ml. ethanol are added. The mixture is concentrated in vacuo, the suspension obtained cooled in the refrigerator, filtered and the residue recrystallized from aqueous ethanol to yield the trans-1-cinnamyloxy-guanidine hemisulfate which is identical with the compound obtained according to Example 1.

EXAMPLE 6

The mixture of 4.0 g. O-(cis-cinnamyl)-hydroxylamine, 3.73 g. S-methyl-isothiourea sulfate and 30 ml. water is refluxed for 4 hours. Hereupon it is evaporated in vacuo, the residue recrystallized from aqueous ethanol and washed with hexane to yield the hygroscopic cis-1-cinnamyloxy-guanidine hemisulfate hemihydrate of the formula $$\begin{array}{c} C_6H_5 \\ \diagdown \\ C=C \\ \diagup\phantom{C}\diagdown \\ H\phantom{C=C}H \end{array} \begin{array}{c} CH_2-O-NH \\ \diagdown \\ C \\ \diagup\phantom{C}\diagdown \\ NH_2 \cdot \tfrac{1}{2}H_2SO_4 \cdot \tfrac{1}{2}H_2O \end{array} \begin{array}{c} NH \\ \diagup\diagup \\ \\ \end{array}$$

The starting material is prepared analogously to that used in Example 1. The N-(cis-cinnamyloxy)-phthalimide melts at 130–134° after recrystallization from ethanol and the O - (cis - cinnamyl)-hydroxylamine hydrochloride at 199–200° after recrystalilzation from ethanol-ethyl acetate.

EXAMPLE 7

The mixture of 4.0 g. O-(cis-cinnamyl)-hydroxylamine, 6.3 g. S-methyl-isothiosemicarbazide hydroiodide and 10 ml. water is refluxed for 4 hours. The supernatant aqueous solution is separated from the oily part and evaporated in vacuo. The residue obtained represents the cis-1-cinnamyloxy-3-amino-guanidine hydroiodide, which is very hygroscopic

EXAMPLE 8

1000 tablets each containing 0.050 g. of the active ingredient:

| Material | G. |
| --- | --- |
| Cis-1-cinnamyloxy-guanidine hemisulfate hemihydrate | 50.0 |
| Tragacanth | 3.0 |
| Lactose | 123.0 |
| Corn starch | 7.5 |
| Magnesium stearate | 1.5 |
| 50% aqueous ethanol, q.s. | |

Procedure

As described in Example 4.

EXAMPLE 9

The mixture of 7.0 g. trans-O-(4-methoxy-cinnamyl)-hydroxylamine, 5.43 g. S-methyl-isothiourea sulfate, 15 ml. preboiled water and 15 ml. methanol is refluxed for 2 hours. It is cooled, the solution decanted from a small amount of oily material and the supernatant diluted with diethyl ether. The precipitate formed is filtered off and recrystallized from water to yield the trans-1-(4-methoxy-cinnamyloxy)-guanidine hemisulfate of the formula $$CH_3O-\!\!\left\langle\!\!\bigcirc\!\!\right\rangle\!\!-\!\!\underset{\underset{H}{|}}{C}\!\!=\!\!C\!\!\diagdown\!\!\underset{CH_2-O-NH-\overset{\overset{O}{\|}}{C}-NH_2}{\phantom{X}} \cdot \tfrac{1}{2}H_2SO_4$$

melting at 94–96°.

The starting material is prepared as follows: The solution of 100 g. 4-bromo-anisole in 500 ml. diethyl ether is added dropwise to the stirred suspension of 12.9 g. magnesium turnings, a crystal iodine and 75 ml. diethyl ether in order to maintain reflux. The mixture is stirred for 1 hour, cooled to —4° and the solution of 30 g. acrolein in 80 ml. diethyl ether is added dropwise. After stirring for 1 hour it is cooled, 100 ml. saturated aqueous ammonium chloride are added and the mixture allowed to stand overnight at room temperature. The organic layer is decanted off, dried, filtered, evaporated in vacuo, distilled and the fraction boiling at 140–145°/15 mm. Hg collected; it represents the 1-(4-methoxy-phenyl)-prop-2-enol.

The solution of 52 g. thereof in 500 ml. diethyl ether is added dropwise to the stirred mixture of 37.6 g. thionyl chloride and 500 ml. diethyl ether. It is immediately evaporated in vacuo, and the residue recrystallized from petroleum ether to yield the trans-4-methoxy-cinnamyl chloride melting at 65–66°.

The mixture of 65 g. thereof, 58 g. N-hydroxy-phthalimide, 108 ml. triethylamine and 400 ml. dimethylformamide is heated at the steam cone for 2 hours. It is cooled, poured over ice, the precipitate formed filtered off and recrystallized from i-propanol to yield the trans-N-(4-methoxy-cinnamyloxy)-phthalimide meltign at 149–151°.

The mixture of 72 g. thereof, 11.6 g. hydrazine hydrate, 15 ml. methanol and 500 ml. methylene chloride is stirred at room temperature for 21 hours, then filtered and the filtrate evaporated in vacuo. The residue is taken up in diethyl ether and the solution evaporated in vacuo to yield the trans-O-(4-methoxy-cinnamyl)-hydroxylamine, which is used without further purification. A small sample thereof is triturated with hydrogen chloride in ethyl acetate to yield the corresponding hydrochloride melting at 188–189° after recrystallization from n-propanol.

EXAMPLE 10

In the analogous manner described in the previous examples, the following compounds are prepared from equivalent amounts of the corresponding starting materials:

(a) Trans-1-(2-methyl-cinnamyloxy)-guanidine hemisulfate, M.P. 82–84° (aqueous butanol),
(b) Trans-1-(3-methyl-cinnamyloxy)-guanidine hemisulfate, M.P. 66–68° (water),
(c) Trans-1-(4-methyl-cinnamyloxy)-guanidine hemisulfate, M.P. 152–154° (water),
(d) Trans-1-(3,4 - dimethyl - cinnamyloxy) - guanidine hemisulfate, M.P. 169–171° (water),
(e) Trans-1-(2-methoxy-cinnamyloxy)-guanidine hemisulfate, M.P. 153–155° (water),
(f) Trans-1-(3-methoxy-cinnamyloxy)-guanidine hemisulfate, M.P. 148–150° (water),
(g) Trans-1-(2-chloro-cinnamyloxy)-guanidine hemisulfate, M.P. 70–74° (water),
(h) Trans-1-(3-chloro-cinnamyloxy) - guanidine hemisulfate, M.P. 137–139° (water),
(i) Trans-1-(4-chloro-cinnamyloxy) - guanidine hemisulfate, M.P. 162–163° (aqueous ethanol),
(j) Trans-(α-methyl-cinnamyloxy)-guanidine hemisulfate of the formula

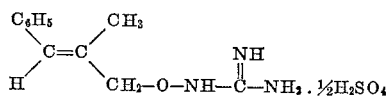

melting at 153–155° after recrystallization from water. The starting material of the latter compound is prepared as follows: To the solution of 45 g. ethyl α-methyl-cinnamate in 150 ml. tetrahydrofuran, the mixture of 4.42 g. lithium aluminum hydride in 200 ml. tetrahydrofuran is added during ½ an hour while stirring and cooling. Stirring is continued for another ½ hour and to the cold mixture 4.4 ml. water, 3.3 ml. 20% aqueous sodium hydroxide and 15.4 ml. water are added in this order. The mixture is filtered, the filtrate evaporated, the residue distilled and the fraction boiling at 142–145°/15 mm. Hg collected; it represents the trans-α-methyl-cinnamyl alcohol.

To the solution of 16.3 g. thereof in 17 ml. diethyl ether and 1.7 ml. pyridine, 7.5 g. phosphorus trichloride are added drop-wise while cooling and stirring. The mixture is stirred at room temperature overnight, refluxed for 3 hours, cooled and poured over ice. The organic layer is extracted 3 times with aqueous sodium bicarbonate and water, dried, filtered, evaporated in vacuo, the residue distilled and the fraction boiling at 118–120°/16 mm. Hg collected; it represents the trans-α-methyl-cinnamyl chloride. It is converted into the desired hydroxylamine analogous to the method described in Example 9.

EXAMPLE 11

The mixture of 6.85 g. O-(trans-cinnamyl)-hydroxylamine, 7.0 g. 2-methylmercapto-imidazoline hydrochloride, 20 ml. water and 20 ml. methanol is refluxed for 3½ hours. It is then cooled, filtered and the filtrate evaporated in vacuo. The residue is dried in high vacuum and recrystallized from acetonitrile to yield the trans-1-cinnamyloxy-2,3-ethylene-guanidine hydrochloride of the formula

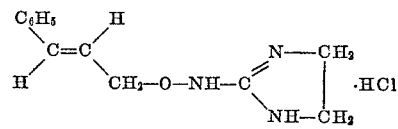

melting at 123–125° (very hygroscopic).

EXAMPLE 12

The mixture of 192 g. O-(trans-cinnamyl)-hydroxylamine, 345 g. S-methyl-isothiourea cyclohexylsulfamate and 5 liter water is stirred and heated on the steam cone for 24 hours, during which time 1 liter ethanol is added in order to solubilize the separating oil. Upon cooling crystals separate, which are filtered off and recrystallized from acetonitrile to yield the trans-1-cinnamloxy-guanidine cyclohexylsulfamate of the formula

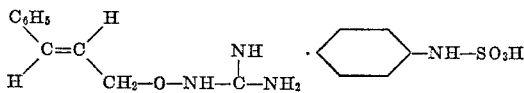

melting at 101–103°.

The starting material is prepared as follows: To the solution of 718 g. trans-cinnamyl alcohol in 1.5 liter methylene chloride, the mixture of 460 ml. thionyl chloride and 560 ml. pyridine is added during 6 hours while keeping the temperature between 5 and 8°. The mixture is stirred at this temperature overnight and the solution of 50 ml. hydrochloric acid in 1 liter water is added while keeping the temperature below 10°. The organic layer is separated, washed with diluted hydrochloric acid, dried and evaporated in vacuo. The residue is distilled and the fraction boiling at 94–99°/2 mm. Hg collected; it represents the trans-cinnamylchloride.

To the mixture of 523 g. thereof, 500 g. N-hydroxyphthalimide and 1 liter dimethylformamide, 620 ml. triethylamine are added whereupon the temperature gradually rises to 87° and crystals begin to separate. The mixture is heated at the steam cone for 2 hours while stirring and after cooling in an ice bath 2 liters water are added. The slurry is stirred at 15° for 1 hour, filtered and the residue washed with 1 liter water and dried in vacuo to yield the N-(trans-cinnamyloxy)-phthalimide melting at 148–149°.

372 g. thereof are dissolved in 3 liters methylene chloride and the solution of 69.6 g. hydrazine hydrate in 150 ml. methanol is added rapidly. The mixture is stirred at room temperature for 16 hours then cooled to 10° and filtered. The residue is washed with 150 ml. methylene chloride and the filtrate is evaporated in vacuo. The residue is triturated with 1 liter isopropanol at 10°, and the mixture acidified with the solution of 110 ml. hydrochloric acid in 500 ml. isopropanol. The slurry is cooled to 10°, filtered, the residue washed with 300 ml. acetone and air dried. It is suspended in 1 liter water, the solution made alkaline with 100 ml. 50% aqueous sodium hydroxide and extracted 2 times with 500 ml. methylene chloride. The extract is washed with water, dried, filtered and evaporated in vacuo to yield the O-(trans-cinnamyl)-hydroxylamine as a colorless oil.

286.8 g. cyclohexylsulfamic acid are dissolved in 1 liter water and to the solution 560 g. calcium hydroxide are added while stirring and the mixture is heated on the steam bath for 1 hour. It is filtered and the filtrate slowly added to the solution of 222 g. S-methyl-isothiourea hemisulfate in 1 liter water while stirring. The mixture is stirred on the steam bath for 3 hours and filtered hot. The residue is washed with 500 ml. hot water, the filtrate cooled and the S-methyl-isothiourea cyclohexylsulfamate separated filtered off and dried in vacuo, M.P. 178–182°.

EXAMPLE 13

Analogous to the method described in the previous examples, the following compounds are prepared from equivalent amounts of the corresponding starting materials:

(a) Trans-1-(2-trifluoromethyl - cinnamyloxy) - guanidine hemisulfate, M.P. 158–160° (water), (b) Trans - 1 - (2,6-dimethyl-cinnamyloxy)-guanidine hemisulfate, M.P. 183–184° (water), (c) Trans-1-(4-methoxy-cinnamyloxy) - 2,3 - ethyleneguanidine hydrochloride, M.P. 73–75° (ethanol-diethyl ether), (d) Trans-1-(4-phenoxy-cinnamyloxy)-guanidine hemisulfate, M.P. 172–175° (water), (e) Cis-1-(4 - methyl - cinnamyloxy)-guanidine hemisulfate, M.P. about 100° (very hygroscopic).

I claim:
1. An aralkenyloxy-guanidine having the formula

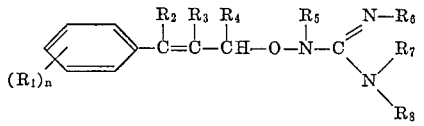

in which $R_1$ is hydrogen, lower alkyl, lower alkoxy, phenoxy, halogeno, trifluoromethyl or lower alkanoyl, $n$ is one of the integers 1 and 2, each of $R_2$, $R_3$, $R_4$, $R_5$, $R_6$, $R_7$ and $R_8$ is hydrogen or lower alkyl, $R_8$ is also amino and acid addition salts thereof.

2. A compound as claimed in claim 1, in which formula $R_1$ is hydrogen, lower alkyl, lower alkoxy, phenoxy, halogeno, trifluoromethyl or lower alkanoyl, $n$ is the integer 1, each of $R_2$, $R_3$, $R_4$, $R_5$, $R_6$, $R_7$ and $R_8$ is hydrogen or alkyl with up to 4 carbon atoms, and $R_8$ is also amino or a pharmaceutically acceptable acid addition salt thereof.

3. A compound as claimed in claim 1 and having the formula

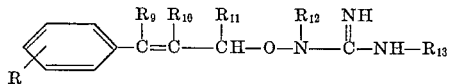

in which R is hydrogen, lower alkyl, phenoxy, halogeno, or trifluoromethyl, each of $R_9$, $R_{10}$, $R_{11}$, $R_{12}$ and $R_{13}$ is hydrogen or methyl and $R_{13}$ also is amino and a pharmaceutically acceptable acid addition salt thereof.

4. A compound as claimed in claim 3 and being the trans-(α-methyl-cinnamyloxy)-guanidine hemisulfate.

5. A compound as claimed in claim 3 and having the formula

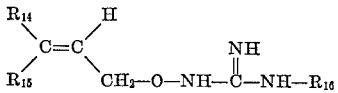

in which one of $R_{14}$ and $R_{15}$ is hydrogen and the other is phenyl, methyl-phenyl, dimethyl-phenyl, methoxyphenyl, phenoxy-phenyl, chloro-phenyl or trifluoromethyl-phenyl, and $R_{16}$ is hydrogen or amino, the hydrochloride, hemisulfate and cyclohexylsulfamate thereof.

6. A compound as claimed in claim 5 and being the trans-1-cinnamyloxy-guanidine hemisulfate.

7. A compound as claimed in claim 5 and being the trans-1-cinnamyloxy-guanidine cyclohexylsulfamate.

8. A compound as claimed in claim 5 and being the cis-1-cinnamyloxy-guanidine hemisulfate.

9. A compound as claimed in claim 5 and being the trans-1-(2-methyl-cinnamyloxy)-guanidine hemisulfate.

10. A compound as claimed in claim 5 and being the trans-1-(2,6-dimethyl-cinnamyloxy)-guanidine hemisulfate.

References Cited

UNITED STATES PATENTS 3,413,303   11/1968   Mull _____ 260—564 X

ROBERT V. HINES, Primary Examiner

U.S. Cl. X.R.

260—239, 240, 254, 256, 295, 309, 310, 326, 340, 343, 358, 463, 476, 490, 501, 551, 552, 553, 554, 564, 618, 631; 424—326